US010322797B2

(12) United States Patent
Jurrell et al.

(10) Patent No.: US 10,322,797 B2
(45) Date of Patent: Jun. 18, 2019

(54) ROTATING SEALING SYSTEMS

(71) Applicant: Bell Helicopter Textron Inc., Fort Worth, TX (US)

(72) Inventors: Travis Jurrell, Fort Worth, TX (US); Timothy Cecil, Forth Worth, TX (US); Scott Poster, Arlington, TX (US); Wesley Porter, Keller, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 55 days.

(21) Appl. No.: 14/636,896

(22) Filed: Mar. 3, 2015

(65) Prior Publication Data

US 2016/0258535 A1 Sep. 8, 2016

(51) Int. Cl.
| | |
|---|---|
| *B64C 27/32* | (2006.01) |
| *F16J 15/3232* | (2016.01) |
| *F16J 15/3256* | (2016.01) |
| *F16J 15/3252* | (2016.01) |
| *B64C 27/12* | (2006.01) |
| *F16J 15/16* | (2006.01) |

(52) U.S. Cl.
CPC .............. *B64C 27/32* (2013.01); *B64C 27/12* (2013.01); *F16J 15/164* (2013.01); *F16J 15/3232* (2013.01); *F16J 15/3252* (2013.01); *F16J 15/3256* (2013.01)

(58) Field of Classification Search
CPC .. F16J 15/3204; F16J 15/3232; F16J 15/3252; F16J 15/3256; B64C 27/00; B64C 27/001; B64C 27/002; B64C 27/04; B64C 27/12
See application file for complete search history.

(56) References Cited

U.S. PATENT DOCUMENTS

| | | | | |
|---|---|---|---|---|
| 1,838,248 A | * | 12/1931 | Bourland | B64B 1/00 244/17.23 |
| 2,984,306 A | * | 5/1961 | Kottsieper | B64C 27/12 416/162 |
| 3,049,357 A | * | 8/1962 | Kosatka | F16C 33/7889 277/565 |
| 3,511,512 A | * | 5/1970 | Wheelock | F16J 15/3232 277/564 |
| 3,561,770 A | * | 2/1971 | Corsi | F16J 15/164 277/554 |
| 3,838,862 A | * | 10/1974 | Fern | F16J 15/3456 277/400 |
| 3,912,199 A | * | 10/1975 | Seibel | B64C 27/32 244/17.11 |
| 3,930,655 A | * | 1/1976 | Fern | F16J 15/3456 277/400 |
| 4,484,752 A | * | 11/1984 | Bentley | F16J 15/164 277/377 |
| 5,251,406 A | * | 10/1993 | Kirn | B23Q 11/0883 451/344 |

(Continued)

*Primary Examiner* — Nicholas L Foster

(57) ABSTRACT

A rotating sealing system includes a non-metallic rotating seal configured to be attached to a rotating shaft. The rotating seal is configured to rotate with the rotating shaft about an axis. The rotating sealing system includes a stationary sealing surface configured to be attached to a stationary housing positioned around the rotating shaft. The stationary sealing surface is substantially parallel to the axis. The rotating seal is configured to seal with the stationary sealing surface as the rotating shaft rotates.

15 Claims, 5 Drawing Sheets

(56) References Cited

U.S. PATENT DOCUMENTS

| | | | | |
|---|---|---|---|---|
| 5,791,592 | A * | 8/1998 | Nolan | B64C 27/14 |
| | | | | 244/17.11 |
| 7,658,386 | B2 * | 2/2010 | Oldenburg | F16J 15/3256 |
| | | | | 277/353 |
| 9,751,576 | B2 * | 9/2017 | Suzuki | F16C 33/7889 |
| 2003/0006563 | A1 * | 1/2003 | Cater | F16J 15/324 |
| | | | | 277/549 |
| 2004/0124586 | A1 * | 7/2004 | Branchereau | F16J 15/164 |
| | | | | 277/549 |
| 2004/0235609 | A1 * | 11/2004 | Chang | F16J 15/3268 |
| | | | | 475/331 |
| 2011/0030503 | A1 * | 2/2011 | Ehinger | F16C 35/077 |
| | | | | 74/606 R |
| 2013/0256064 | A1 * | 10/2013 | Bongaerts | B01J 20/24 |
| | | | | 184/102 |
| 2016/0229470 | A1 * | 8/2016 | Suzuki | F16C 33/7889 |
| 2018/0087670 | A1 * | 3/2018 | Poster | B64C 27/12 |

* cited by examiner

ROTATING SEALING SYSTEMS

TECHNICAL FIELD

This disclosure relates to rotating sealing systems, for example, for rotating shafts used, for example, in aircrafts or rotorcrafts.

BACKGROUND

Seals of many different types, e.g., face seals or lip seals, have been used for a variety of applications. One example application is a sealing system (or a sealing assembly) for a machine or device having a rotating shaft in a stationary housing where oil, water or other fluid must be sealed from other cavities in the machine or device. In some cases, the sealing system has a wear sleeve attached on the rotating shaft. When the rotating shaft, e.g., a mast of a rotorcraft, is big or long, it may be inconvenient to install and/or uninstall the wear sleeve.

SUMMARY

This disclosure describes rotating sealing systems for rotating shafts. Such rotating shafts can be used in aircrafts or rotorcrafts.

Some aspects of the subject matter can be implemented as rotating sealing systems. A rotating sealing system includes a non-metallic rotating seal configured to be attached to a rotating shaft. The rotating seal is configured to rotate with the rotating shaft about an axis. The rotating sealing system includes a stationary sealing surface configured to be attached to a stationary housing positioned around the rotating shaft. The stationary sealing surface is substantially parallel to the axis. The rotating seal is configured to seal with the stationary sealing surface as the rotating shaft rotates.

This, and other aspects, can include one or more of the following features. The rotating seal can include an elastomeric material. The rotating seal can be friction fit to the rotating shaft. The rotating seal can include a composite material. The rotating shaft can be a mast of a rotorcraft rotor. The rotating shaft can be configured to rotate at approximately 400 rpm or less. The stationary sealing surface can include a metallic material. The stationary sealing surface can include a composite material.

Some aspects of the subject matter can be implemented as a method. A non-metallic rotating seal is attached to a rotating shaft. The rotating seal is configured to rotate with the rotating shaft around an axis. A stationary sealing surface is attached to a stationary housing positioned around the rotating shaft. The stationary sealing surface is substantially parallel to the axis. The rotating seal is configured to seal with the stationary sealing surface as the rotating shaft rotates.

This, and other aspects, can include one or more of the following features. The rotating seal can include an elastomeric material or a composite material. Attaching the rotating seal to the rotating shaft can include friction fitting the rotating seal to the rotating shaft. Friction fitting the rotating seal to the rotating shaft can include hand-placing the rotating seal around the rotating shaft without using tooling. The non-metallic rotating seal can be aligned to the stationary sealing surface. The rotating seal can be hand-removed from the rotating shaft. Hand-removing the rotating seal from the rotating shaft can include hand-removing the rotating seal without using tooling. The stationary sealing surface can include a metallic material or a composite material.

Some aspects of the subject matter can be implemented as an aircraft gearbox. The gearbox includes a stationary housing, a shaft configured to rotate within the stationary housing about an axis, a non-metallic seal attached to the shaft to rotate with the shaft, and a sealing surface. The sealing surface is attached to the stationary housing and is substantially parallel to the axis. The non-metallic seal is configured to seal with the sealing surface. The sealing surface is configured to remain stationary as the shaft rotates.

This, and other aspects, can include one or more of the following features. The shaft can include a mast. The shaft can be configured to rotate at approximately 400 rpm or less. The seal can include an elastomeric material or a composite material. The sealing surface can include a metallic material or a composite material.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
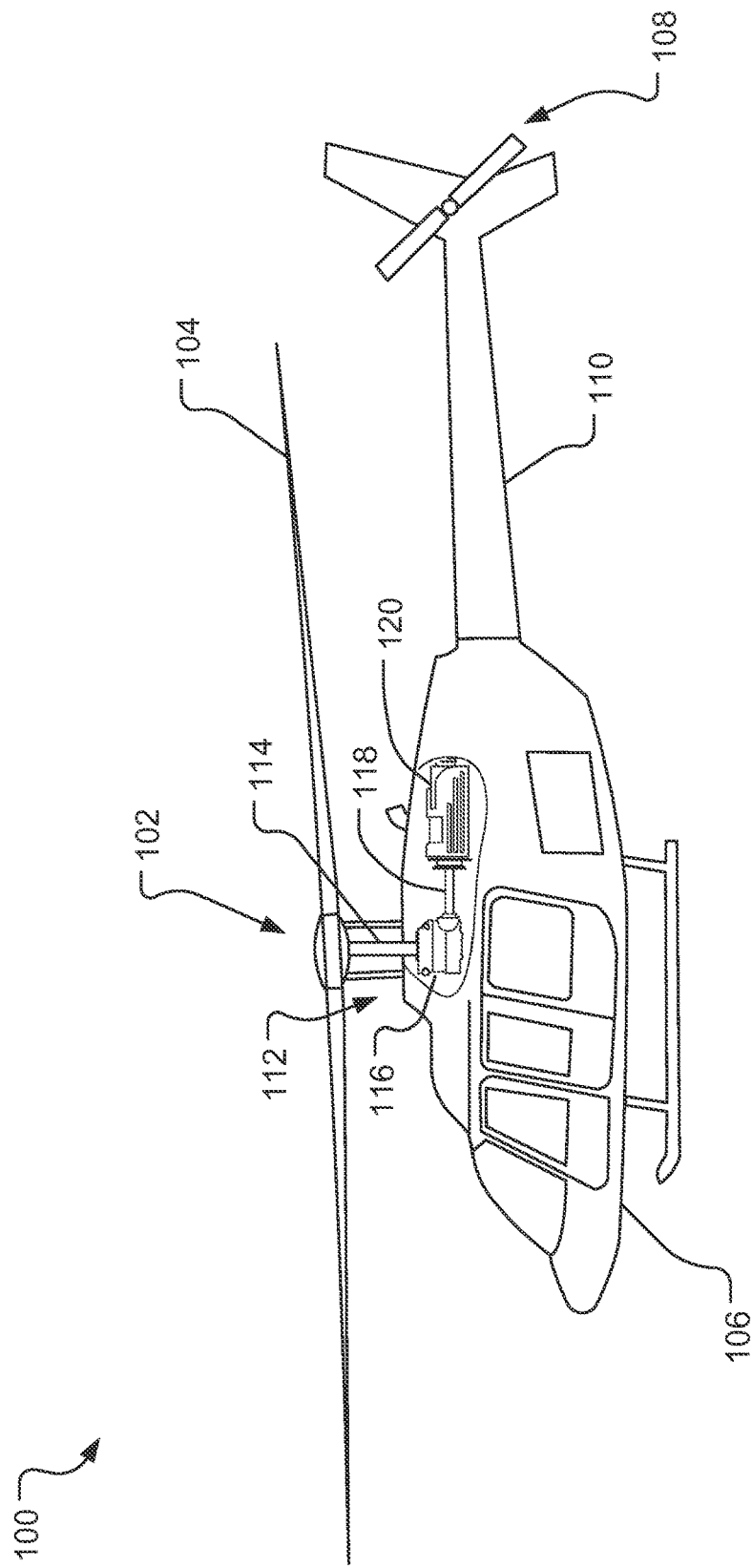
FIG. 1A is a schematic diagram of an example rotorcraft.

This specification describes a rotating sealing system. The rotating sealing system described here can be applied in any device or system including a rotating shaft, e.g., any rotorcraft with fixed wing gearbox/transmission that requires non-traditional mast seals in both new design and retrofit capabilities. The rotating sealing system described here can include an outward elastomeric sealing lip seal attached to the rotating shaft, e.g., a mast of a rotorcraft rotor. The elastomeric sealing lip seal can be put on or pulled off the rotating shaft by hand and held in place by friction fit, which eliminates the need for a wear sleeve on the rotating shaft and allows reduced time for seal installation, fewer seal parts and increased reliability. During initial install or in the event of repair work, the wear sleeve is easily replaced, instead of the need for complex tooling to remove/install on the rotating shaft. The elastomeric sealing lip seal in the rotating sealing system decreases the need to change existing configurations, and can be implemented with minimal redesign to existing mast or gearbox configuration change.

FIG. 1 shows a schematic diagram of a rotorcraft 100 according to an embodiment of the disclosure. It should be understood that while the rotorcraft 100 example depicted comprises a helicopter, embodiments of the disclosure are not limited to any particular setting or application, and embodiments may be used in any setting or application requiring a rotating sealing system for a rotating shaft. Such a setting or application can include, for example, tiltrotor aircrafts, turbine systems, automotive transmission systems, to name a few.

The rotorcraft 100 has a rotor system 102 with multiple rotor blades 104. The rotorcraft 100 can further include a fuselage 106, an anti-torque system 108, and an empennage 110. The rotorcraft 100 also includes an engine 120 that provides power to the rotor system 102 and/or the anti-torque system 108.

In some implementations, the engine 120 supplies torque to the rotor system 102 for rotating the rotor blades 104 via a gearbox system 112. The gearbox system 112 can include a mast 114 (e.g., a rotating shaft), a gearbox 116, and a gearbox shaft 118. The gearbox shaft 118 is configured to be mechanically coupled to the engine 118 and the gearbox 116 and be capable of transmitting torque and rotation. The gearbox 116 can be mechanically coupled to the rotor system 102 via the mast 114 that is also capable of transmitting torque and rotation. In some examples, the rotor system 102 has a control system for selectively controlling the pitch of each rotor blade 104 in order to selectively control direction, thrust, and lift of the rotorcraft 100.

Figure 1B:
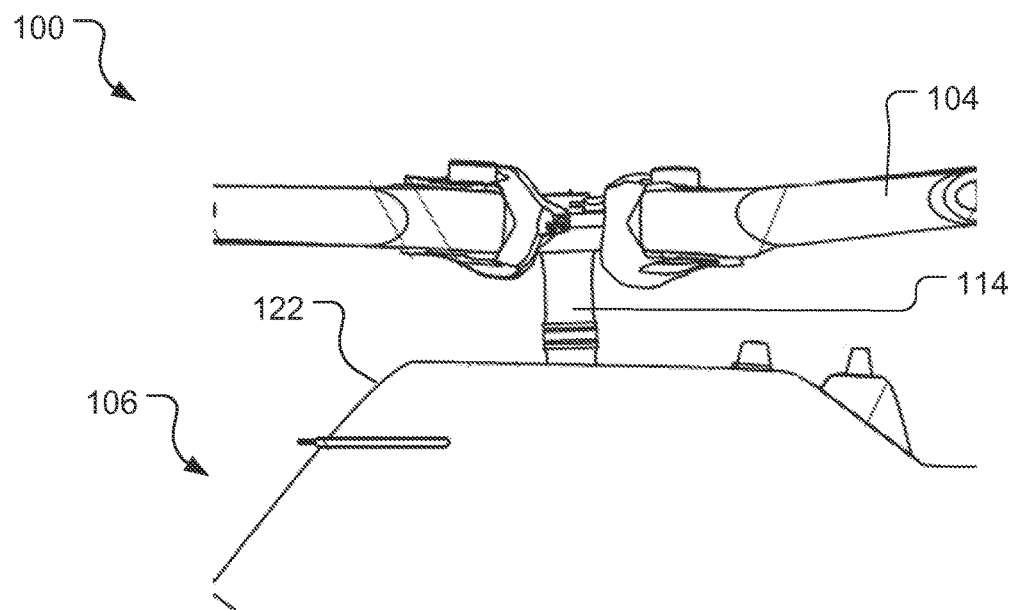
FIG. 1B is a perspective view of an example gearbox system of the example rotorcraft of FIG. 1A.
Figure 1C:
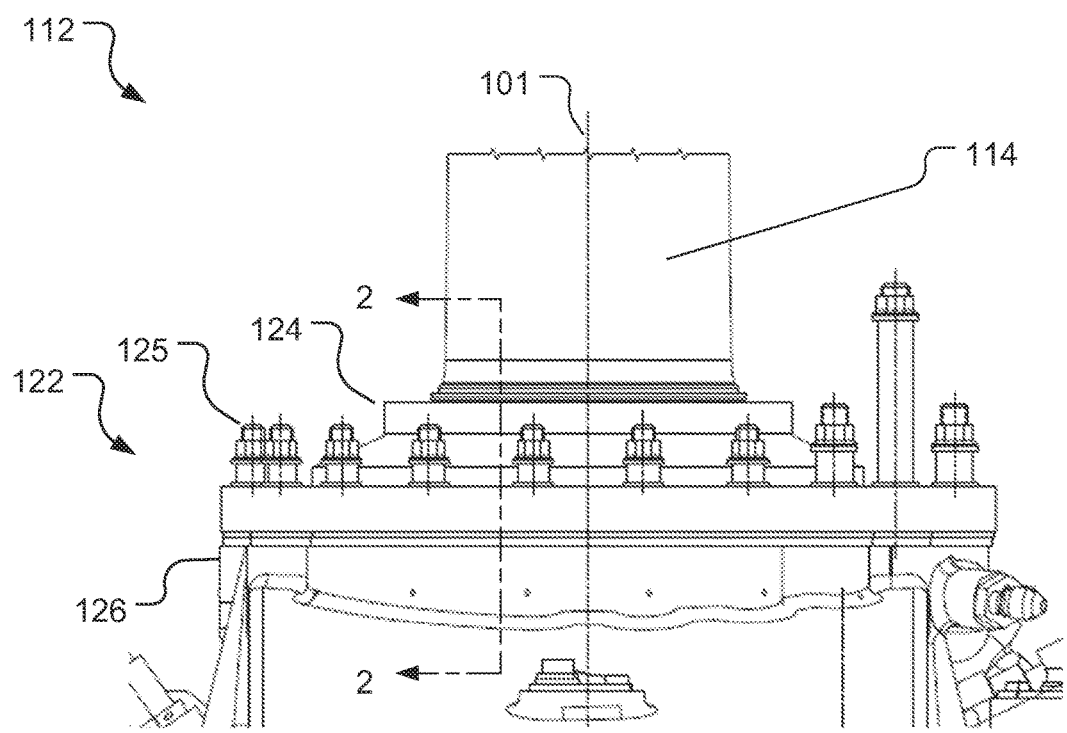
FIG. 1C is a side view of the example gearbox system of FIG. 1B.

FIGS. 1B and 1C show perspective and side views of the gearbox system 112. The mast 114 can be a rotating shaft that rotates about an axis 101, e.g., a central axis of the mast 114. In some cases, the mast 114 is configured to rotate at any rotational speed, for example, approximately 400 rpm or more or less. The mast 114 can be made of any material, e.g., a metallic material such as stainless steel or a bimetallic material or other materials, and have any shape, e.g., a substantially cylindrical shape or other shape.

In some implementations, the mast 114 is a long shaft. One end of the mast 114 can be coupled to the rotor blades 104 and the other end of the mast 114 can be coupled to the gearbox 116. The mast 114 can be partially enclosed in a housing 122 (e.g., a retainer housing) of the gearbox system 112 that is stationary relative to the rotating mast 114. In some examples, the housing 122 has a cover 124 and a hollow housing body 126. The cover 124 can include a central hole that allows the mast 114 to penetrate into the hollow housing body 126. The cover 124 can be secured to the housing body 126 via fasteners 125, e.g., bolts or other fasteners. The gearbox 116 can be also enclosed in the housing 122, e.g., under the mast 114 in the hollow housing body 126, and/or be bolted to an inner wall of the housing 122.

A sealing system can be provided for the mast 114 and the stationary housing 122. The sealing system is configured to keep transmission oil in the gearbox 116 and/or moisture out of the gearbox 116. In some implementations, a wear sleeve, e.g., a metallic wear sleeve, is put on the mast 114 and rotates together with the mast 114. As the mast 114 rotates, the wear sleeve seals with an elastomeric seal on the stationary housing 122 to form a sealing surface on the mast 114. In some cases, the sealing surface may be too large to affect rotating performance of the gearbox system 112 or the rotorcraft 100. Putting the wear sleeve on or pulling off the mast 114 may be difficult or need additional elaborate tooling. The sealing system described below with reference to FIG. 2 can decrease or eliminate such issues.

Figure 2:
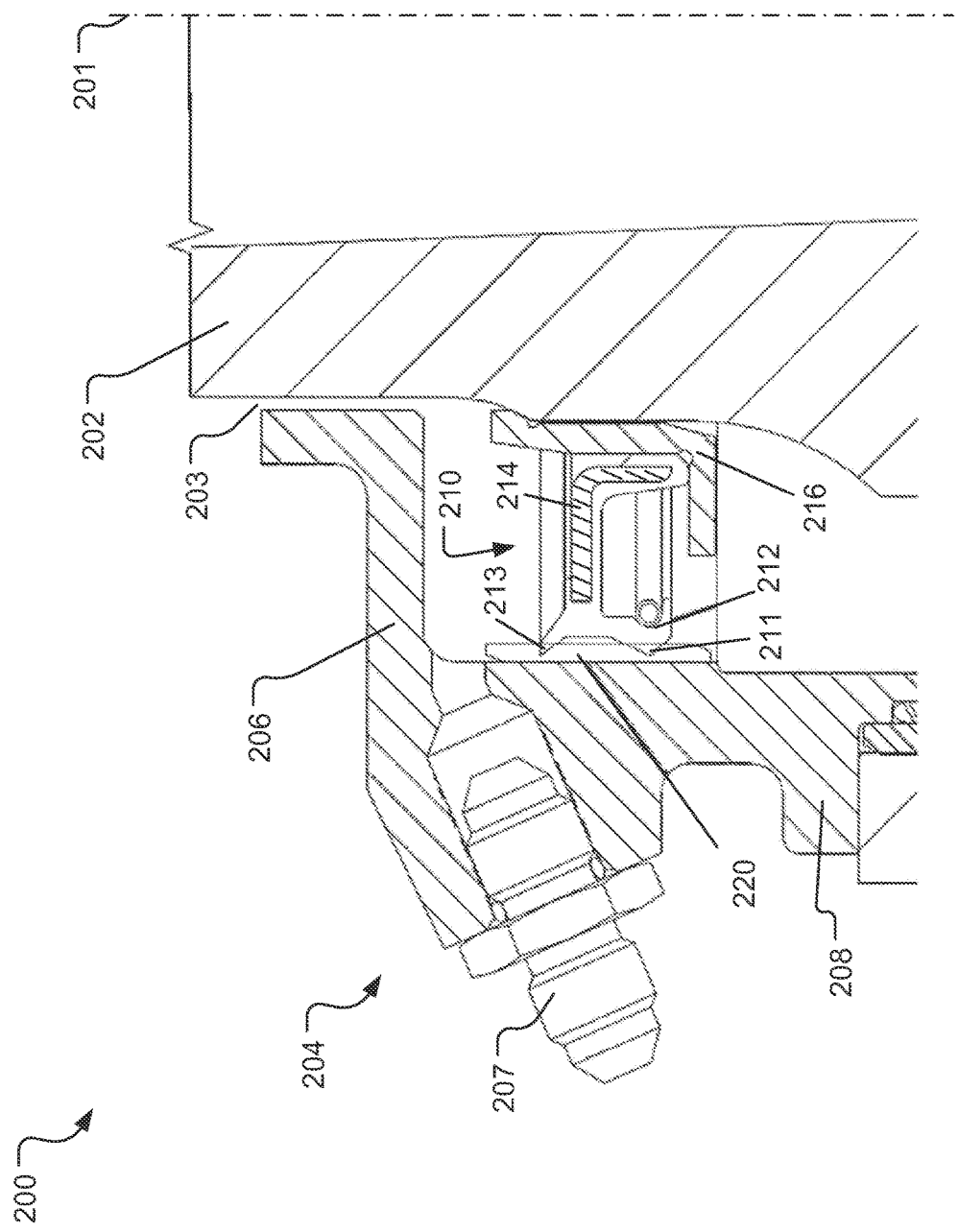
FIG. 2 is a cross-sectional view of a portion of an example gearbox system including an example rotating sealing system.

In some other implementations, as discussed in further details in FIG. 2, the sealing system includes a non-metallic rotating seal, e.g., an outward elastomeric sealing lip seal, attached to the mast 114 and rotating with the mast 114. As the mast 114 rotates, the non-metallic rotating seal seals with a stationary wear sleeve attached to the housing 122 to form a sealing surface on the stationary housing 122. As described below, the stationary wear sleeve is substantially parallel to a central axis of the rotating shaft. This configuration of the sealing system allows easier installation without attaching the wear sleeve to the mast 114, smaller sealing surface, and/or higher reliability.

FIG. 2 shows a cross-sectional view of a portion of an example gearbox system 200, e.g., similar to the gearbox system 112 of FIGS. 1A-1C. The gearbox system 200 includes a rotating shaft 202, e.g., similar to the mast 114 of FIGS. 1A-1C, and a stationary housing 204, e.g., similar to the housing 122 of FIGS. 1B-1C. The rotating shaft 202 is enclosed, e.g., partially, in the stationary housing 204, and rotates about a central axis 201 of the rotating shaft 202, e.g., similar to the axis 101 of FIG. 1C.

In some implementations, the stationary housing 204 includes a cover 206, e.g., similar to the cover 124 of FIG. 1C, and a housing body 208, e.g., similar to the housing body 126 of FIG. 1C. The cover 206 can be secured to the housing body 208 by fasteners 207, e.g., bolts, screws, or other fasteners. In some examples, the rotating shaft 202 is substantially cylindrical. The cover 206 can be an annular ring sized to allow the rotating shaft 202 to penetrate. The annular ring can have a central axis parallel to the central axis 201 of the rotating shaft 202, e.g., overlapping with the central axis 201. A diameter of the annular ring can be larger, e.g., slightly, than a diameter of the rotating shaft 202, thus a gap 203 can form between the cover 206 and the rotating shaft 202, which can be used to let moisture out of the housing body 208 or the gearbox system 200.

A gearbox (not shown), e.g., similar to the gearbox 116 of FIG. 1A, can be coupled to the rotating shaft 202, e.g., under the rotating shaft 202 and within the housing body 208. Gears, bearings, and other mechanical components of a gearbox are subject to wear and heat generation due to contact with other components, e.g., the rotating shaft 202. These mechanical components may be lubricated to reduce friction and transfer heat away from the components. A lubricant can be introduced to reduce the friction. Examples of lubricants include transmission oil, biolubricants derived from plants and animals, synthetic oils, solid lubricants, and aqueous lubricants.

To keep the lubricant in the gearbox system 200 and/or moisture out of the gearbox system 200, the gearbox system 200 can include a rotating sealing system for the rotating shaft 202 and the stationary housing 204. The rotating sealing system includes a rotating seal 210 attached to the rotating shaft 202 and a stationary seal 220 attached to the stationary housing 204. The rotating seal 210 rotates with the rotating shaft 202, e.g., about the central axis 201, and is configured to engage with the stationary seal 220 as the rotating shaft 202 rotates. The stationary seal 220 provides a stationary sealing surface interacting with the rotating seal 210.

In some implementations, the stationary seal 220 is a wear sleeve, e.g., a metallic wear sleeve. The wear sleeve can have a substantially rigid sealing surface interacting with the rotating seal 210. The stationary seal 220 can include a metallic material, a composite material, an elastomeric material or combinations of them. The stationary seal 220 can be attached to the housing body 208 of the stationary housing 204, e.g., secured to a vertical wall of the housing body 208. In some examples, the stationary seal 220 is aligned such that the stationary sealing surface is substantially parallel to the central axis 201 of the rotating shaft 202, as illustrated in FIG. 2. In some other examples, the stationary sealing surface is inclined to the central axis 201 with an angle. The rotating seal 210 may have a suitable shape to seal with the inclined stationary sealing surface.

In some implementations, the rotating seal 210 is a non-metallic rotating seal. The non-metallic rotating seal can be configured to elastically interact with the stationary sealing surface of the stationary seal 220, e.g., to provide a better sealing than rigid sealing with the stationary sealing surface.

The non-metallic rotating seal can include an outward elastomeric portion that interacts with the stationary sealing surface as the rotating shaft 202 rotates. The non-metallic rotating seal can have a width larger (e.g., slightly) than a distance between the stationary sealing surface and an outside of the rotating shaft 202, such that the outward elastomeric portion is pressed onto the stationary sealing surface.

In some cases, to reduce a sealing surface area during interaction between the rotating seal 210 and the stationary seal 220, the outward elastomeric portion can include a protruded portion 211 that has a larger diameter than other portions of the outward elastomeric portion. As the rotating shaft 202 rotates, only the protruded portion 211 can interact and be pressed onto the stationary sealing surface. In some examples, the outward elastomeric portion includes a secondary protruded portion 213, as shown in FIG. 2. The secondary protruded portion 213 can keep the moisture out of the gearbox system 200.

In some implementations, the rotating seal 210 includes another elastomeric portion interacting with the rotating shaft 202, such that the rotating seal 210 can fit snugly around the rotating shaft 202 and hold in place by friction fit. In some cases, the non-metallic rotating seal 210 is put on or pull off the rotating shaft 202 by hand. The rotating shaft 202 can have a slope portion for the rotating seal 210. The slope portion can have an increasing circumference along a direction from the top to the bottom of the rotating shaft 202. In some examples, a seal holder 216 is used to hold the rotating seal 210 in place. The seal holder 216 is secured to the rotating shaft 202, e.g., by screw threads or other fasteners. As the rotating shaft 202 rotates, the rotating seal 210 and the seal holder 206 rotate together with the rotating shaft 202.

The rotating seal 210 can be an outward sealing lip seal that is pressed outwardly onto the rotating shaft 202. The rotating seal 210 can be held in place by friction fit. When the rotating shaft 202 rotates, the rotating seal 210 rotates with the rotating shaft 202. In some examples, the rotating seal 210 is a double sealing lip seal, that is, an upper lip seal and a lower lip seal with a middle portion between them. The middle portion has a smaller diameter than the upper lip seal and the lower lip seal. The upper lip seal and the lower lip seal can seal with the stationary sealing surface of the stationary seal 220 as the rotating shaft 202 rotates, which can increase sealing between the rotating shaft 202 and the stationary housing 204.

The non-metallic rotating seal 210 can include an elastomeric material, e.g., carbon, rubber, or polymer such as Teflon, a composite material, or a ceramic material. In some examples, the non-metallic rotating seal 210 includes an elastomeric part 212 comprising an elastomeric material and a metallic part 214 comprising a metallic material. The metallic part 214 is configured to increase strength (or rigidness) of the rotating seal 210. As illustrated in FIG. 2, the metallic part 214 can be inserted into the elastomeric part 212.

In a particular example, the rotating shaft 202 rotates at a rotational speed that decreases a centrifugal force on the rotating seal 210 (i.e., the force with which the rotating seal 210 is drawn away from the rotating shaft 202). In some implementations, e.g., implementations in which the rotating shaft 202 is the mast of a rotorcraft rotor system, the rotational speed can be approximately 400 rpm or less. In other implementations, the rotational speed can similarly be tailored to decrease the centrifugal force on the rotating seal. The non-metallic rotating seal 210 is attached to the rotating shaft 202 and rotates with the rotating shaft 202. As the rotating shaft 202 rotates, the non-metallic rotating seal 210 seals with the stationary sealing surface of the stationary seal 220, which can keep transmission oil in the gearbox system 200 and moisture out of the gearbox system 200. Experiments showed that a non-metallic rotating seal such as the non-metallic rotating seal 210 implemented on a mast of a rotorcraft operated at 400 rpm or less has a working lifetime of at least 300 hours.

Figure 3:
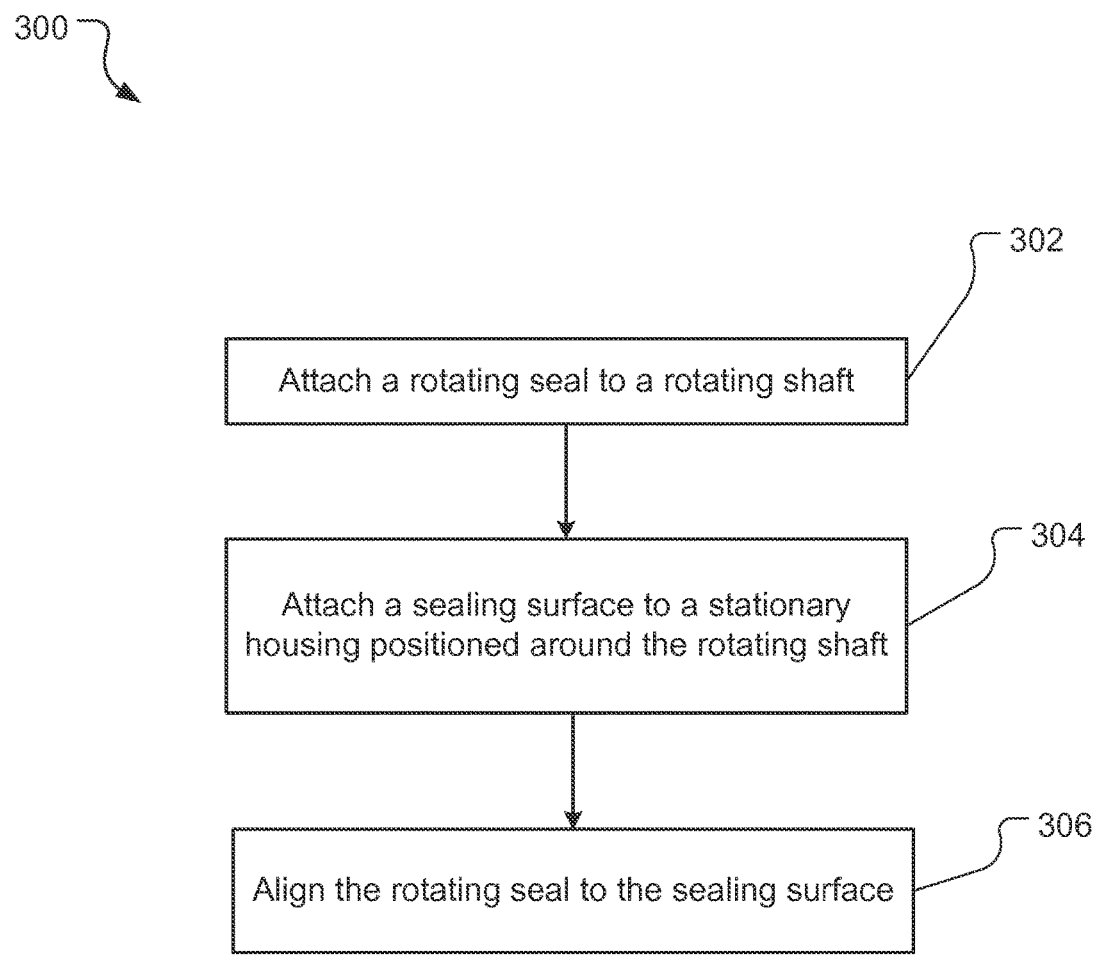
FIG. 3 is a flowchart of an example process according to an example embodiment of the disclosure.

FIG. 3 is a flowchart of an example process 300 for configuring a rotating sealing system described in the disclosure. The rotating sealing system can be implemented in a system or device having a rotating shaft that rotates in a stationary housing, e.g., a rotorcraft gearbox system having a rotating mast.

At 302, a rotating seal is attached to a rotating shaft. The rotating shaft can be any rotating shaft, e.g., similar to the mast 114 of FIGS. 1A-1C or the mast 202 of FIG. 2. In some examples, the rotating shaft rotates at approximately 400 rpm or less. The rotating seal, e.g., similar to the rotating seal 210 of FIG. 2, is configured to rotate with the rotating shaft around a rotary axis, e.g., similar to a central axis of the rotating shaft. The rotating seal is a non-metallic rotating seal and can comprise an elastomeric material or a composite material.

In some examples, the rotating seal is an outward elastomeric sealing lip seal that can be pressed outwardly onto the rotating shaft 202. The rotating seal can be friction fit to the rotating shaft, e.g., by hand placing the rotating seal around the rotating shaft. In a particular example, the rotating seal is hand-placed around the rotating shaft without using tooling.

At 304, a sealing surface is attached to a stationary housing positioned around the rotating shaft. A stationary seal, e.g., similar to the stationary seal 220 of FIG. 2, can be attached to the stationary housing, e.g., similar to the stationary housing 122 of FIGS. 1B-1C or the stationary housing 204 of FIG. 2. The stationary seal provides the sealing surface. The stationary seal can be positioned such that the sealing surface is substantially parallel to the rotary axis of the rotating shaft. The sealing surface is configured to remain stationary as the rotating shaft rotates. The stationary seal can include a metallic material or a composite material. In some examples, the stationary seal is a wear sleeve, e.g., a metallic wear sleeve.

At 306, the rotating seal is aligned to the sealing surface. The rotating seal is configured to seal with the stationary sealing surface as the rotating shaft rotates. The rotating seal is aligned to the stationary sealing surface such that the rotating seal engages with the stationary sealing surface to keep oil in the housing and moisture out of the housing. For example, as noted above, the rotating seal can include an outward elastomeric portion which can be pressed onto the stationary sealing surface during alignment. In some cases, to uninstall the rotating sealing system, the process 300 comprises hand-removing the rotating seal from the rotating shaft, e.g., without using tooling.

Figure 4:
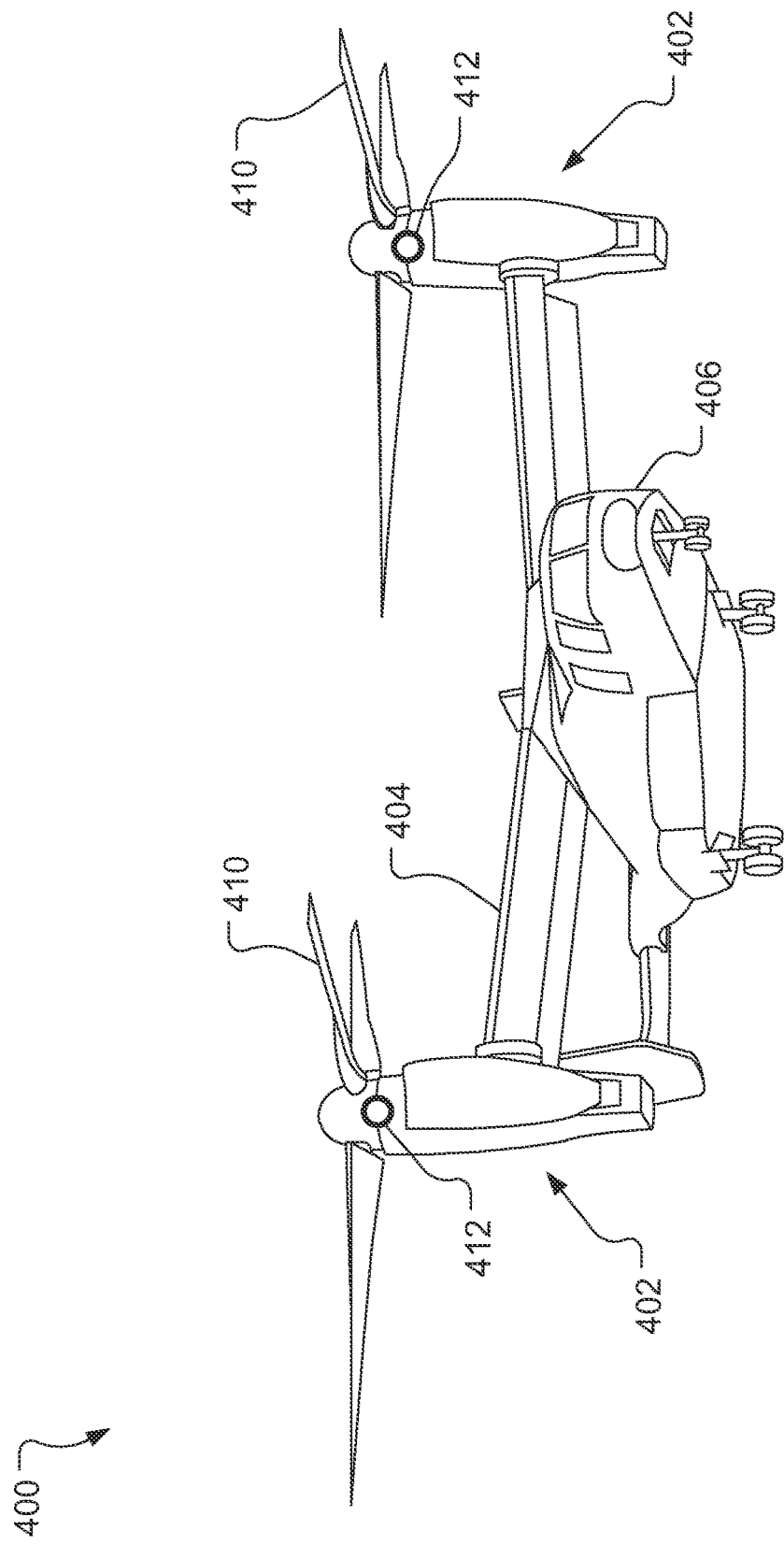
FIG. 4 is another schematic diagram of an example rotorcraft.

As another example aircraft, FIG. 4 shows a schematic diagram of an example tiltrotor aircraft 400. The aircraft 400 includes a fuselage 406 with attached wings 404. Nacelles 402 are carried at the outboard ends of the wings 404 and are rotatable between the helicopter-mode position shown and a forward-facing airplane-mode position (not shown). The nacelles 402 carry engines and transmissions for powering rotor systems 410 in rotation. An engine may be an internal combustion engine, an electrical power source and associated motor, or any other suitable technique for the powering rotor system 410. The aircraft 400 can include a gearbox system 412 that includes one or more rotating sealing systems for rotating shafts.

In general, the rotating sealing system described here can be implemented in any system in which sealing between a rotating shaft and a stationary housing is required. For example, the gearbox shaft 118 of FIG. 1A is also a rotating shaft that is mechanically coupled to the engine 118 and the gearbox 116. The rotating sealing system can be implemented for the gearbox shaft 118 and a gearbox housing of the gearbox 116.

Thus, particular implementations of the subject matter have been described. Other implementations are within the scope of the following claims.

The invention claimed is:

1. A rotating sealing system for a rotorcraft comprising:
a stationary vertical housing having an open end;
a vertical rotor mast configured to rotate within the stationary vertical housing about a vertical axis, wherein the vertical rotor mast has a first end extending through the open end of the stationary vertical housing and a second end coupled to a gearbox;
a cover removably attached to the open end of the stationary vertical housing, wherein the cover has a central hole that forms a gap between the vertical rotor mast and the cover;
an L-shaped seal holder having a first portion attached to the vertical rotor mast within the stationary vertical housing below the cover and the gap, and a second portion extending outwards from the vertical rotor mast;
a rotating seal attached to and held in place by the L-shaped seal holder, the rotating seal comprising an elastomeric part having one or more protruded portions, and an L-shaped metallic part inserted in the elastomeric part;
the L-shaped metallic part configured to increase a stiffness or rigidity of the rotating seal, and the L-shaped metallic part having a first portion substantially parallel to the vertical rotor mast and having a second portion extending outward beyond the L-shaped seal holder towards a stationary seal, and wherein the first portion of the L-shaped metallic part is positioned between the second portion of the L-shaped metallic part and the second portion of the L-shaped seal holder; and
the stationary seal attached to an interior of the stationary vertical housing, the stationary seal having a substantially cylindrical shape with a stationary sealing surface substantially parallel to the vertical axis, wherein the one or more protruded portions of the rotating seal is configured to seal with the stationary sealing surface as the vertical rotor mast rotates.

2. The system of claim 1, wherein:
the vertical rotor mast has a first end coupled to a rotor and a second end coupled to a gearbox.

3. The system of claim 1, wherein the vertical rotor mast is configured to rotate at approximately 400 rpm or less.

4. The system of claim 1, wherein the stationary seal comprises a metallic material, a composite material, or an elastomeric material.

5. A method for sealing a vertical rotor mast of a rotorcraft, the method comprising:
providing a stationary vertical housing having an open end, and the vertical rotor mast configured to rotate within the stationary vertical housing about a vertical axis, wherein the vertical rotor mast has a first end extending through the open end of the stationary vertical housing and a second end coupled to a gearbox;
providing a cover having a central hole configured to form a gap between the vertical rotor mast and the cover when attached to the open end of the stationary vertical housing;
attaching a first portion of an L-shaped seal holder to the vertical rotor mast within the stationary vertical housing below where the cover and the gap will be when attached, the L-shaped seal holder configured to rotate with the vertical rotor mast and having a second portion extending outwards from the vertical rotor mast;
attaching a rotating seal to the L-shaped seal holder, the rotating seal configured to rotate with the vertical rotor mast about the vertical axis, wherein the rotating seal comprises an elastomeric part and an L-shaped metallic part inserted in the elastomeric part, the elastomeric part configured to be attached to the L-shaped seal holder and having one or more protruded portions, the L-shaped metallic part configured to increase a stiffness or rigidity of the rotating seal, and the L-shaped metallic part having a first portion substantially parallel to the vertical rotor mast and having a second portion extending outward beyond the L-shaped seal holder towards a stationary seal, and wherein the first portion of the L-shaped metallic part is positioned between the second portion of the L-shaped metallic part and the second portion of the L-shaped seal holder;
attaching the stationary seal to an interior of the stationary vertical housing, the stationary seal having a substantially cylindrical shape with a stationary sealing surface being substantially parallel to the vertical axis, wherein the one or more protruded portions of the rotating seal is configured to seal with the stationary sealing surface as the vertical rotor mast rotates; and
attaching the cover to the open end of the stationary vertical housing.

6. The method of claim 5, wherein attaching the rotating seal to the L-shaped seal holder comprises placing the rotating seal without tooling.

7. The method of claim 5, further comprising aligning the rotating seal to the stationary sealing surface.

8. The method of claim 5, further comprising removing the rotating seal without tooling.

9. The method of claim 5, wherein the stationary seal comprises a metallic material, a composite material, or an elastomeric material.

10. A rotorcraft comprising:
a stationary vertical housing having an open end;
a stationary seal attached to an interior of the stationary vertical housing proximate to the open end of the stationary vertical housing;
a cover removably attached to the open end of the stationary vertical housing, the cover having a central hole;
a vertical rotor mast configured to rotate within the stationary vertical housing about a vertical axis, the vertical rotor mast having a first end coupled to a rotorcraft rotor and extending through the central hole of the cover, with a gap between the vertical rotor mast and the cover, and the vertical rotor mast having a second end coupled to a gearbox;

a single L-shaped seal holder having a first portion attached to the vertical rotor mast within the stationary vertical housing below the cover and the gap, the first portion configured to rotate with the vertical rotor mast, and the L-shaped seal holder having a second portion extending outward from the vertical rotor mast, the L-shaped seal holder holding a rotating seal in place and aligned with the stationary seal;

the rotating seal attached to the L-shaped seal holder to rotate with the vertical rotor mast, the rotating seal comprising an elastomeric part attached to the L-shaped seal holder and having one or more protruded portions, and an L-shaped metallic part disposed within the elastomeric part and configured to increase a stiffness or rigidity of the rotating seal, and the L-shaped metallic part having a first portion substantially parallel to the vertical rotor mast, and having a second portion extending outward beyond the L-shaped seal holder towards the stationary seal, and wherein the first portion of the L-shaped metallic part is positioned between the second portion of the L-shaped metallic part and the second portion of the L-shaped seal holder; and the stationary seal having a substantially cylindrical shape with a stationary sealing surface substantially parallel to the vertical axis, and the one or more protruded portions of the rotating seal configured to seal with the stationary sealing surface as the vertical rotor mast rotates.

11. The rotorcraft of claim 10, wherein the vertical rotor mast is configured to rotate at approximately 400 rpm or less.

12. The rotorcraft of claim 10, wherein the stationary seal comprises a metallic material, a composite material, or an elastomeric material.

13. The rotorcraft of claim 10, wherein the one or more protruded portions comprise two protruded portions that seal with the stationary sealing surface as the vertical rotor mast rotates.

14. The rotorcraft of claim 10, wherein:
the rotating seal has a first end proximate to the cover and second end opposite the first end;
the second portion of the L-shaped metallic part is proximate to the first end of the rotating seal, and the second portion of the L-shaped metallic part is longer than the first portion of the L-shaped metallic part; and
the first portion of the L-shaped metallic part extends proximate to the second end of the rotating seal.

15. The rotorcraft of claim 14, wherein the first portion of the L-shaped seal holder is attached to the vertical rotor mast with one or more fasteners and the first portion of the L-shaped seal holder is longer than the second portion of the L-shaped seal holder.

* * * * *